(12) United States Patent
Kikuchi

(10) Patent No.: US 8,612,554 B2  
(45) Date of Patent: Dec. 17, 2013

(54) PORTABLE FILE SERVER FOR WIRELESSLY TRANSMITTING AND RECEIVING DATA TO AND FROM A TERMINAL WHEREIN THE EFFECTIVE DISTANCE FOR WIRELESSLY TRANSMITTING AND RECEIVING IS ADJUSTED BY SELECTING FROM A LIST OF DISTINCT DISTANCES

(75) Inventor: Akihiro Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 2284 days.

(21) Appl. No.: 10/732,261

(22) Filed: Dec. 11, 2003

(65) Prior Publication Data
US 2004/0148515 A1  Jul. 29, 2004

(30) Foreign Application Priority Data
Dec. 13, 2002 (JP) .............. P2002-361610

(51) Int. Cl.
- *G06F 15/16* (2006.01)
- *G06F 15/177* (2006.01)
- *H04L 12/26* (2006.01)
- *H04M 1/00* (2006.01)

(52) U.S. Cl.
USPC ......... 709/220; 370/252; 709/203; 455/575.7

(58) Field of Classification Search
USPC .............. 709/203, 220; 455/69, 127, 92, 556, 455/522, 575.7; 370/328, 252
See application file for complete search history.

(56) References Cited

U.S. PATENT DOCUMENTS

| | | | | |
|---|---|---|---|---|
| 5,537,415 A | * | 7/1996 | Miller et al. | 370/314 |
| 5,842,114 A | * | 11/1998 | Ozluturk | 455/69 |
| 6,470,453 B1 | * | 10/2002 | Vilhuber | 726/4 |
| 6,526,444 B1 | * | 2/2003 | Blair | 709/225 |
| 6,598,167 B2 | * | 7/2003 | Devine et al. | 726/8 |
| 6,748,543 B1 | * | 6/2004 | Vilhuber | 726/8 |
| 6,826,692 B1 | * | 11/2004 | White | 726/8 |
| 6,968,571 B2 | * | 11/2005 | Devine et al. | 726/11 |
| 7,030,517 B2 | * | 4/2006 | Hansmann et al. | 307/150 |
| 7,031,659 B2 | * | 4/2006 | Tomoda et al. | 455/41.2 |
| 7,039,445 B1 | * | 5/2006 | Yoshizawa | 455/575.7 |
| 7,092,369 B2 | * | 8/2006 | Fuccello et al. | 370/328 |
| 7,461,164 B2 | * | 12/2008 | Edwards et al. | 709/236 |
| 7,475,252 B2 | * | 1/2009 | Jeffries et al. | 713/184 |
| 7,522,729 B2 | * | 4/2009 | Ishidoshiro | 380/270 |

(Continued)

FOREIGN PATENT DOCUMENTS

JP  05-143254  6/2004

*Primary Examiner* — Jerry Dennison
*Assistant Examiner* — Daniel C Murray
(74) *Attorney, Agent, or Firm* — Rader, Fishman & Grauer PLLC (57) ABSTRACT

A portable file server includes a radio field intensity input unit, a current controller, and an antenna. A radio field intensity for use in wireless communication between the portable file server and a terminal through the antenna is inputted to the radio field intensity input unit. The current controller increases or decreases the amount of signal current for data to be transmitted to the terminal in accordance with the radio field intensity inputted to the radio field intensity input unit. The signal current is, in turn, outputted to the antenna. Thus, the radio field intensity is controlled such that the radio waves can be received only in the area where wireless communication between the portable file server and the terminal takes place; thus, unauthorized wireless access from outside of this area will be prevented. Hence, the portable file server provides enhanced security.

10 Claims, 7 Drawing Sheets

| RADIO FIELD INTENSITY | COMMUNICATION AREA (RADIUS FROM PORTABLE FILE SERVER) |
|---|---|
| 20dBm | 100m |
| 10dBm | 20 – 30m |
| 3dBm | 5m |

(56) References Cited

U.S. PATENT DOCUMENTS

| | | | |
|---|---|---|---|
| 7,546,340 B2* | 6/2009 | Terasawa | 709/203 |
| 7,570,929 B1* | 8/2009 | Trompower | 455/114.3 |
| 7,665,129 B2* | 2/2010 | Carpy et al. | 726/12 |
| 7,805,484 B2* | 9/2010 | Susaki et al. | 709/203 |
| 7,814,533 B2* | 10/2010 | Devine et al. | 726/3 |
| 7,917,653 B2* | 3/2011 | So | 709/248 |
| 7,986,956 B2* | 7/2011 | Bridge et al. | 455/522 |
| 8,085,748 B2* | 12/2011 | Thermond et al. | 370/338 |
| 8,095,631 B2* | 1/2012 | Manico et al. | 709/222 |
| 8,234,341 B2* | 7/2012 | Rothschild | 709/206 |
| 8,400,935 B2* | 3/2013 | Pelletier et al. | 370/252 |
| 8,417,296 B2* | 4/2013 | Caballero et al. | 455/566 |
| 2002/0046353 A1* | 4/2002 | Kishimoto | 713/202 |
| 2002/0075843 A1* | 6/2002 | Lau | 370/349 |
| 2002/0193078 A1* | 12/2002 | MacFarlane Shearer et al. | 455/69 |
| 2003/0055738 A1* | 3/2003 | Alie | 705/26 |
| 2003/0157959 A1* | 8/2003 | Makela et al. | 455/556 |
| 2003/0214779 A1* | 11/2003 | Socolofsky | 361/683 |
| 2004/0059825 A1* | 3/2004 | Edwards et al. | 709/230 |
| 2004/0203989 A1* | 10/2004 | Karaoguz | 455/522 |
| 2004/0205123 A1 | 10/2004 | Terasawa | |
| 2005/0037787 A1* | 2/2005 | Bachner et al. | 455/502 |
| 2005/0135336 A1* | 6/2005 | Kato et al. | 370/352 |
| 2005/0193130 A1* | 9/2005 | Logue et al. | 709/229 |
| 2005/0201557 A1* | 9/2005 | Ishidoshiro | 380/44 |
| 2005/0235045 A1* | 10/2005 | Narayanaswami et al. | 709/217 |
| 2006/0143266 A1* | 6/2006 | Ohto et al. | 709/203 |
| 2007/0005730 A1* | 1/2007 | Torvinen et al. | 709/219 |
| 2007/0116034 A1* | 5/2007 | Bridge et al. | 370/448 |
| 2008/0189368 A1* | 8/2008 | Rothschild | 709/205 |
| 2008/0270530 A1* | 10/2008 | Susaki et al. | 709/203 |
| 2009/0043703 A1* | 2/2009 | Chen | 705/41 |
| 2009/0248375 A1* | 10/2009 | Billiotte et al. | 703/2 |
| 2009/0305742 A1* | 12/2009 | Caballero et al. | 455/566 |
| 2010/0058194 A1* | 3/2010 | Owen | 715/740 |
| 2010/0082821 A1* | 4/2010 | Rosenblatt et al. | 709/228 |
| 2010/0191837 A1* | 7/2010 | Linden et al. | 709/220 |
| 2012/0063337 A1* | 3/2012 | Shukla | 370/252 |
| 2012/0123889 A1* | 5/2012 | Mosquera | 705/26.1 |
| 2012/0173731 A1* | 7/2012 | Lin et al. | 709/226 |
| 2012/0224226 A1* | 9/2012 | Rothschild | 358/1.18 |
| 2013/0172045 A1* | 7/2013 | Caballero et al. | 455/552.1 |

* cited by examiner

| RADIO FIELD INTENSITY | COMMUNICATION AREA (RADIUS FROM PORTABLE FILE SERVER) |
|---|---|
| 20dBm | 100m |
| 10dBm | 20-30m |
| 3dBm | 5m |

FIG. 7

PORTABLE FILE SERVER FOR WIRELESSLY TRANSMITTING AND RECEIVING DATA TO AND FROM A TERMINAL WHEREIN THE EFFECTIVE DISTANCE FOR WIRELESSLY TRANSMITTING AND RECEIVING IS ADJUSTED BY SELECTING FROM A LIST OF DISTINCT DISTANCES

BACKGROUND OF THE INVENTION

1. Field of the Invention

The present invention relates to portable file servers, and more particularly, to a portable file server that enables wireless data transmission and reception between the portable file server and a terminal.

2. Description of the Related Art

In recent years, data transmission and reception between electronic devices over a wireless communication network, such as a wireless local area network (LAN), have become widely used. For example, Japanese Unexamined Patent Application Publication No. 5-143254 discloses a wireless print server which allows a plurality of data processing devices to share a single printer over a wireless communication network (see page 2 and FIG. 2 of JP-A-5-143254). In such a wireless print server, wireless communication provides easy installation and wiring and reduced wiring space.

There are other wireless servers, such as network attached storage (NAS). Unfortunately, such wireless servers are cumbersome and not portable.

There have been attempts to miniaturize wireless servers for portability in order to use them in restricted spaces, such as in conference rooms among certain people. However, an unauthorized third party might eavesdrop on the radio waves; thus, this type of wireless server is unsuitable for portable use in terms of security.

SUMMARY OF THE INVENTION

The present invention is provided to solve the aforementioned problems. It is an object of the present invention to provide a portable file server which allows the radio field intensity to be set such that a wireless network can be established in a specified area and thus provide enhanced security.

A portable file server of the present invention for wirelessly transmitting and receiving data to/from a terminal includes a radio field intensity input unit for inputting a radio field intensity, an antenna, and a current controller for increasing or decreasing the amount of signal current for the data in accordance with the radio field intensity, the data being outputted to the antenna.

According to the present invention, the radio field intensity is set such that the radio waves can be received only in the area where wireless communication between the portable file server and the terminal takes place, and therefore a wireless network can be established in a specified area. Accordingly, unauthorized wireless access from outside of this area will be prevented, thereby providing improved security.

DESCRIPTION OF THE PREFERRED EMBODIMENTS

Figure 1:
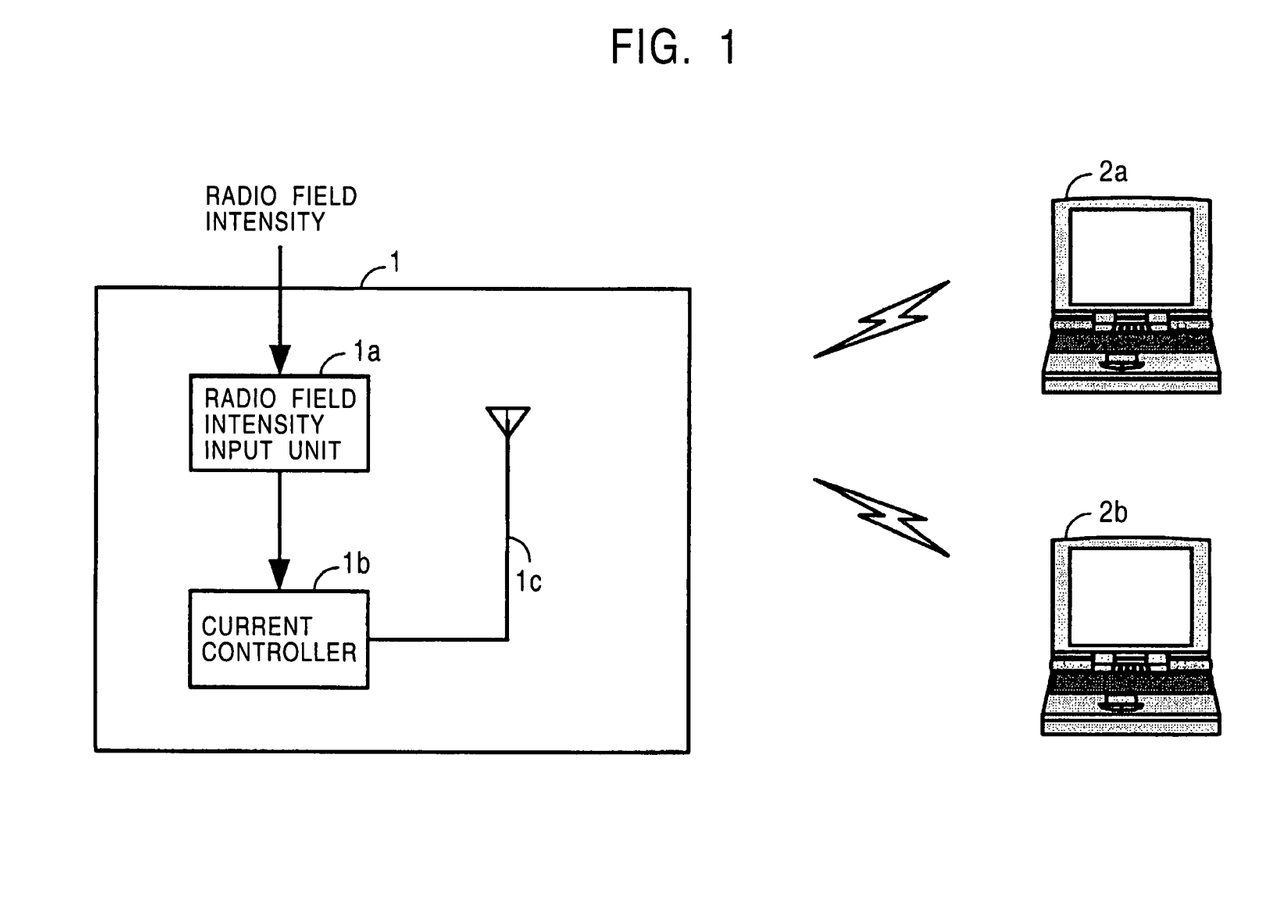
FIG. 1 is a schematic view of a portable file server according to the present invention.

The present invention now will be described by referring to the accompanying drawings. FIG. 1 is a schematic view of a portable file server according to the present invention. Referring to FIG. 1, a portable file server 1 includes a radio field intensity input unit 1a, a current controller 1b, and an antenna 1c. Terminals 2a and 2b wirelessly transmit and receive data to/from the portable file server 1.

A radio field intensity for use in wireless communication with the terminals 2a and 2b via the antenna 1c is inputted to the radio field intensity input unit 1a. For example, when the portable file server 1 wirelessly communicates with the terminals 2a and 2b in a conference room, the radio field intensity is set so as to be receivable only in the conference room.

In accordance with the radio field intensity inputted to the radio field intensity input unit 1a, the current controller 1b increases or decreases the amount of signal current for the data to be transmitted to the terminals 2a and 2b. The signal current is, in turn, outputted to the antenna 1c. For example, when the radio field intensity is set high, the current controller 1b increases the amount of signal current such that the radio waves can be received in an extended area. On the other hand, when the radio field intensity is set low, the current controller 1b decreases the amount of signal current such that the radio waves can be received in a reduced area.

The antenna 1c transmits the signal current for the data fed from the current controller 1b to the terminals 2a and 2b over radio waves and receives radio waves transmitted from the terminals 2a and 2b.

The portable file server 1 operates as follows: assuming that the portable file server 1 is used with the terminals 2a and 2b in a conference room, to prevent unauthorized access from outside of the conference room, the radio field intensity is inputted to the radio field intensity input unit 1a such that the radio waves can be received only in the conference room.

In accordance with the radio field intensity inputted to the radio field intensity input unit 1a, the current controller 1b increases or decreases the amount of signal current for the data to be transmitted to the terminals 2a and 2b. The signal current is, in turn, outputted to the antenna 1c. That is, the distance the radio waves propagate is adjusted, so that the radio waves can be received only within the conference room.

The radio waves for use in the wireless communication between the portable file server 1 and the terminals 2a and 2b are received only in the area where they are used so that wireless access from outside of this area is prevented. Accordingly, the portable file server 10 prevents unauthorized access and thus provides enhanced security.

Figure 2:
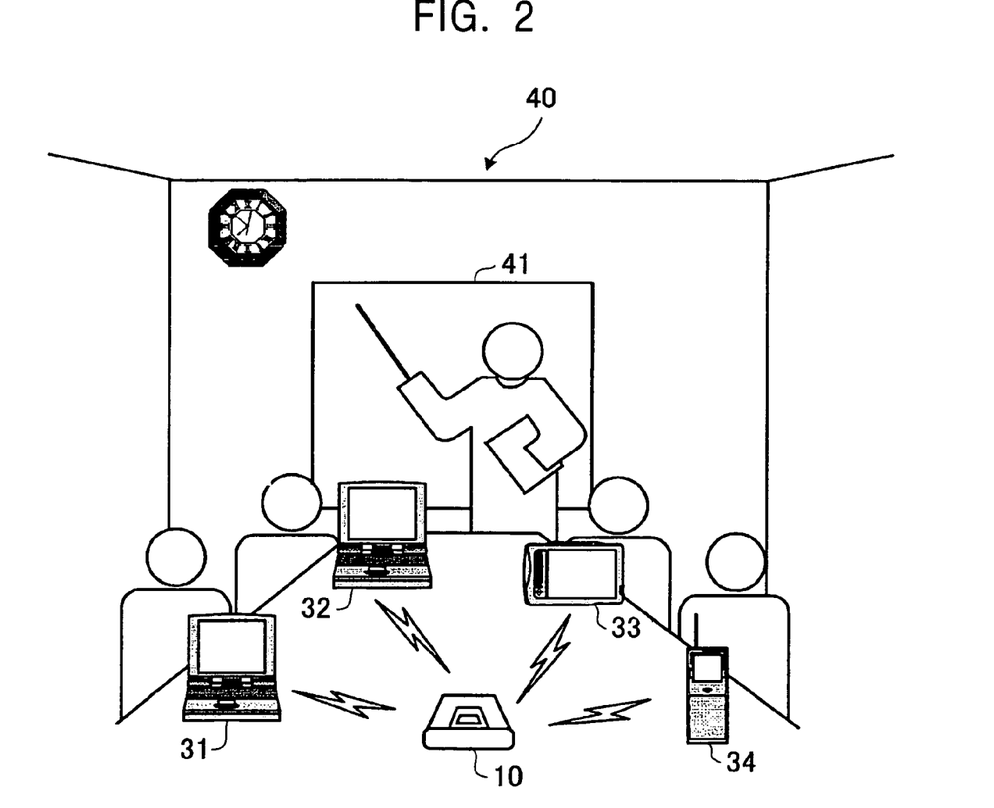
FIG. 2 is a schematic drawing of an application of the portable file server.

FIG. 2 is a schematic drawing of an application of the portable file server of the present invention. Referring to FIG. 2, in a conference room 40, a portable file server 10, notebook personal computers or terminals 31 and 32, a personal digital assistant (PDA) or terminal 33, and a cellular phone or terminal 34 are interconnected via a wireless network. In addition, the conference room 40 is provided with a screen 41.

The radio field intensity is set in the portable file server 10 such that the radio waves can be received only in the conference room 40. That is, the portable file server 10 can transmit data exclusively to the terminals 31 to 34 in the conference room 40 and vice versa.

The portable file server 10 stores data necessary for the conference, such as drawings and tables that will be displayed on the screen 41. When the drawings and tables are displayed on the display of the terminal 31 or are stored in the terminal 31, the portable file server 10 is instructed to transmit the data for the drawings and tables to the terminal 31. The portable file server 10, in turn, transmits the requested data to the terminal 31.

When requested to store data by the terminals 31 to 34, the portable file server 10 stores the data transmitted from the terminals 31 to 34. When requested to transfer data by the terminals 31 to 34, the portable file server 10 receives the data from the terminals 31 to 34 and transmits the data to a designated terminal.

Accordingly, the portable file server 10 enables the terminals 31 to 34 to share data with one another. Since the portable file server 10 permits the radio waves to be received only in the conference room 40, an unauthorized third party is unable to receive data stored in the portable file server 10 from outside of the conference room 40. Hence, there is no chance for the unauthorized third party to acquire the data, and thus the portable file server 10 provides enhanced security.

Figure 3:
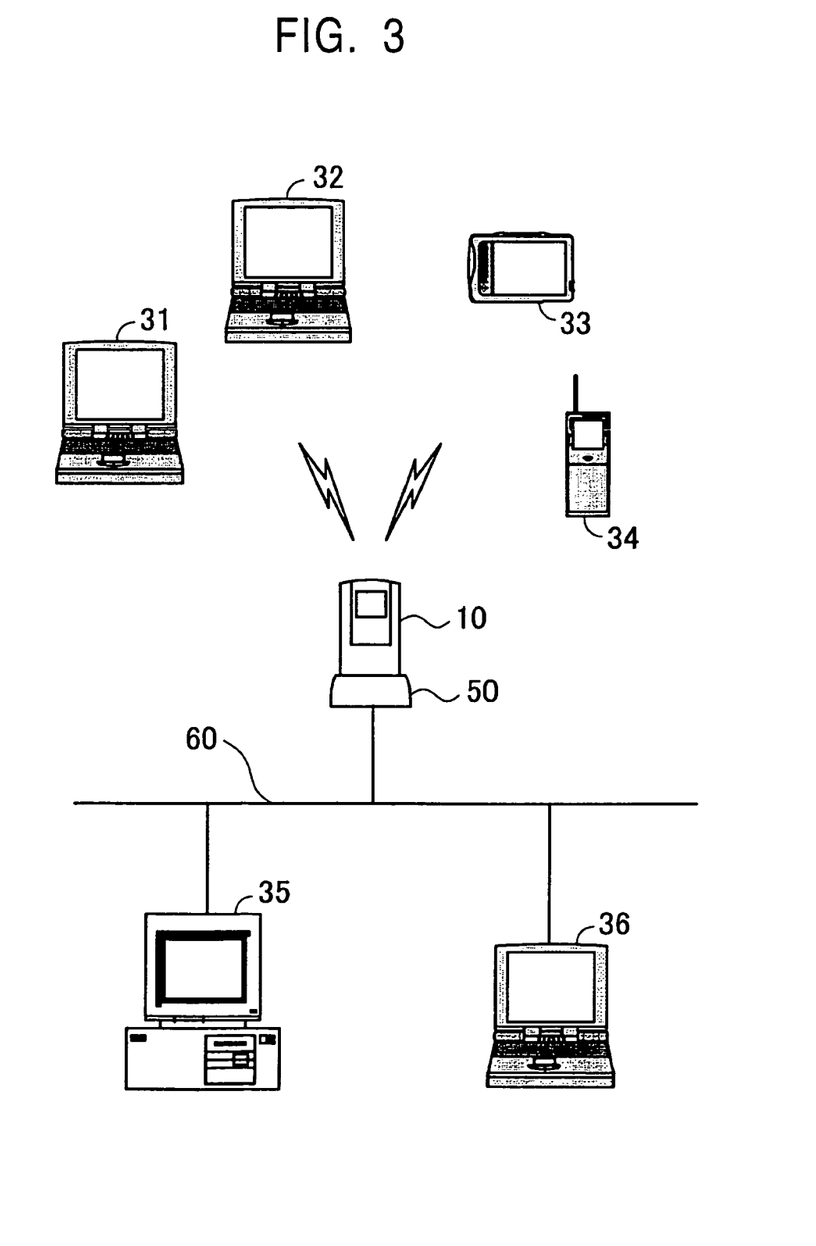
FIG. 3 is a schematic drawing of an application of the portable file server connected to a wired network.

The portable file server 10 may be connected to a wired network. FIG. 3 shows an application of the portable file server 10 connected to a wired network. Referring to FIG. 3, a cradle 50 to which the portable file server 10 is attached is connected to a local area network or LAN 60, which is a wired network. In the LAN 60, a desktop personal computer or terminal 35 and a notebook personal computer or terminal 36 are interconnected. The terminals 35 and 36 have no wireless function and can transmit and receive data only through the LAN 60. The cradle 50 connects the portable file server 10 to the LAN 60, and thus the portable file server 10 can transmit data to the terminals 35 and 36 and receive data therefrom.

FIG. 3 also illustrates the terminals 31 to 34 which wirelessly transmit data to the portable file server 10 and receive data therefrom. In the portable file server 10, the radio field intensity is set such that the portable file server 10 can transmit and receive data to/from the terminals 31 to 34 in a specified area.

The portable file server 10 is connected to the cradle 50 and thus can transmit and receive data to/from the terminals 35 and 36 having no wireless function. Since the portable file server 10 can communicate wirelessly with the terminals 31 to 34, the portable file server 10 enables the terminals 31 to 34 to transmit and receive data to/from the terminals 35 and 36 without a wireless function, and thus the terminals 31 to 34 and terminals 35 and 36 can share data through the portable file server 10.

Figure 4:
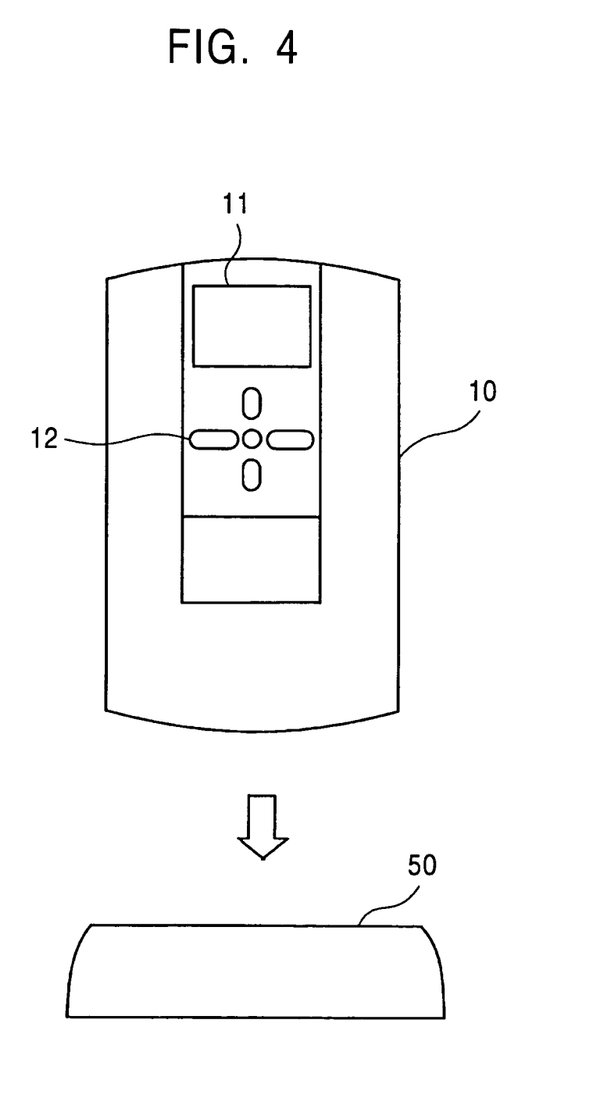
FIG. 4 is a plan view of the portable file server and a cradle according to the present invention.

FIG. 4 is a plan view of the portable file server 10 that is insertable into the cradle 50. The portable file server 10 includes a liquid crystal display or LCD 11 and keys 12. The cradle 50 is connected to the LAN 60 shown in FIG. 3.

The portable file server 10 is connected to the LAN 60 via the cradle 50, whereby the portable file server 10 can communicate with the terminals 35 and 36 that are connected to the LAN 60.

Figure 5:
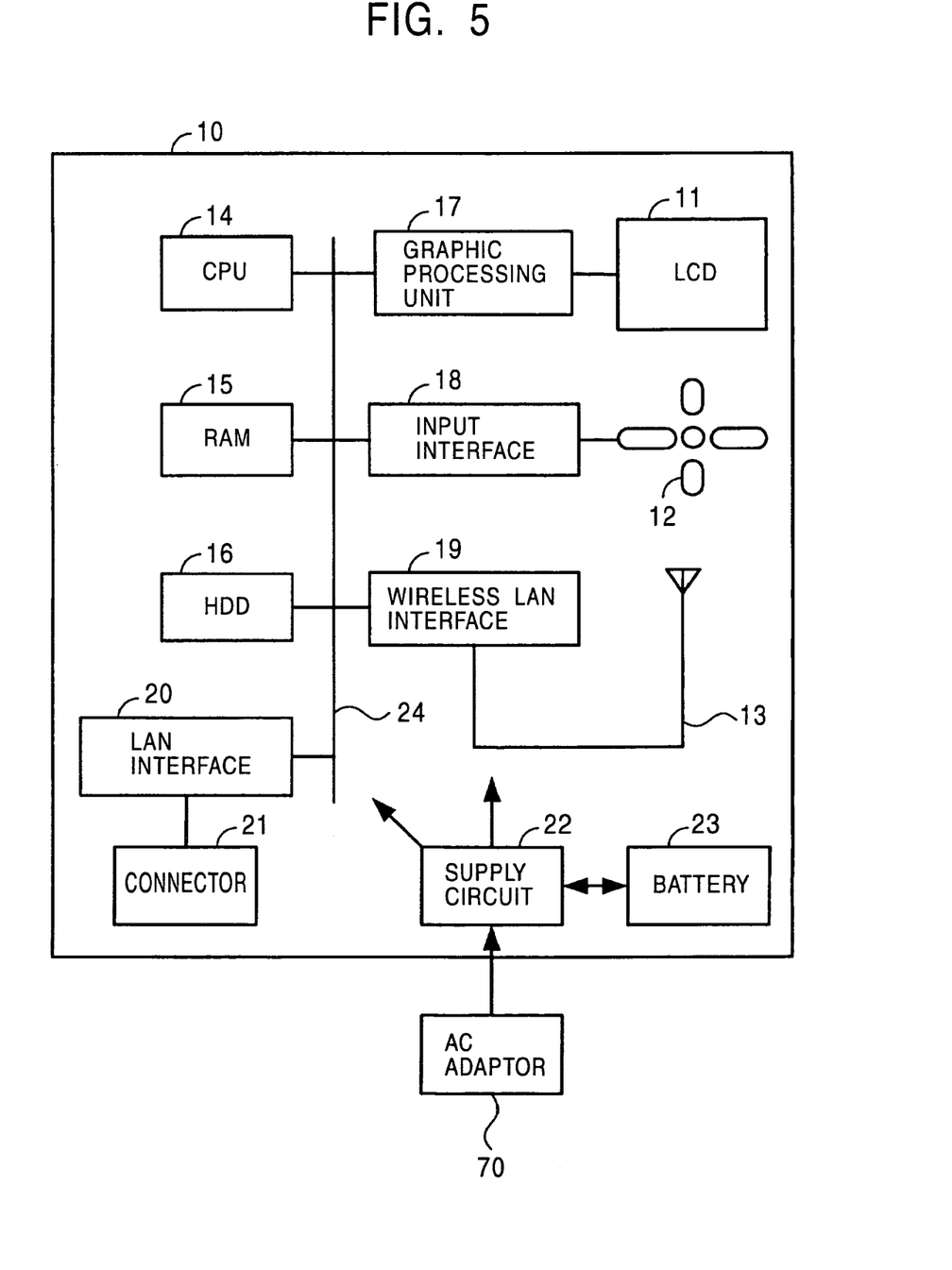
FIG. 5 is a block diagram of the structure of the portable file server.

FIG. 5 is a block diagram of the structure of the portable file server 10. The portable file server 10 includes the LCD 11, the keys 12, an antenna 13, a central processing unit or CPU 14, a random access memory or RAM 15, a hard disk drive or HDD 16, a graphic processing unit 17, an input interface 18, a wireless LAN interface 19, a LAN interface 20, a connector 21, a supply circuit 22, a battery 23 and a bus 24. The portable file server 10 is connected to an AC adaptor 70. This AC adaptor 70 accepts AC voltage from an outlet and outputs DC voltage to the portable file server 10.

Parts of the operating system and application programs, which will be executed by the CPU 14, are temporarily stored in the RAM 15. Also, the RAM 15 stores various kinds of data necessary for the CPU 14 to process instructions. The HDD 16 stores the operating system, the application programs, and data to be shared by the terminals 31 to 36.

The graphic processing unit 17 is connected to the LCD 11. When requested by the CPU 14, the graphic processing unit 17 displays an image on the LCD 11. The input interface 18 connected to the keys 12 transmits signals from the keys 12 to the CPU 14 via the bus 24.

The wireless LAN interface 19 is connected to the built-in antenna 13. When requested by the CPU 14, the wireless LAN interface 19 transmits data to the terminals 31 to 34 and receives data therefrom over the wireless LAN. The CPU 14 instructs the wireless LAN interface 19 to increase or decrease the amount of signal current for the data to be wirelessly transmitted to the terminals 31 to 34. The signal current is, in turn, outputted to the antenna 13.

The LAN interface 20 is connected to the connector 21. The cradle 50 shown in FIG. 4B has a connector that is connected to the LAN 60. This connector of the cradle 50 can be connected to the connector 21. That is, inserting the portable file server 10 to the cradle 50 permits the connector 21 to be connected to the LAN 60. When requested by the CPU 14, the LAN interface 20 transmits data to the terminals 35 and 36 and receives data therefrom over the LAN 60.

The supply circuit 22 is connected to the AC adaptor 70. The AC adaptor 70 converts and steps down AC voltage fed from an outlet to a voltage suitable for use in the portable file server 10, and the resultant voltage is supplied to the supply circuit 22. The supply circuit 22 supplies current from the AC adaptor 70 to all the components of the portable file server 10 and to the battery 23 to keep it fully charged at all times. When the AC adaptor 70 is not connected to the supply circuit 22, the supply circuit 22 applies voltage fed from the battery 23 to the components of the portable file server 10. If power fails or the plug of the AC adaptor 70 comes out from the outlet resulting in interruption of the power supply from the AC adaptor 70, the power source is switched to the battery 23 to supply electricity to the components of the portable file server 10.

The bus 24 connects the CPU 14 to the RAM 15, the HDD 16, the graphic processing unit 17, the input interface 18, the wireless LAN interface 19, and the LAN interface 20. The CPU 14 controls the portable file server 10.

In accordance with the radio field intensity inputted from the keys 12, the CPU 14 instructs the wireless LAN interface 19 to increase or decrease the amount of signal current for data to be transmitted and outputted wirelessly to the antenna 13. For example, when the radio field intensity is set low using the keys 12, the CPU 14 instructs the wireless LAN interface 19 to decrease the amount of signal current for data to be outputted to the antenna 13. When requested by the CPU 14, the wireless LAN interface 19 decreases the amount of signal current for the data to be outputted to the antenna 13. On the other hand, when the radio field intensity is set high using the keys 12, the CPU 14 instructs the wireless LAN interface 19 to increase the amount of signal current for data to be outputted to the antenna 13. When requested by the CPU 14, the wireless LAN interface 19 increases the amount of signal current for the data to be outputted to the antenna 13.

The radio field intensity may be inputted from the terminals 31 to 34. The terminals 31 to 34 transmit data regarding the radio field intensity to the antenna 13. The antenna 13, in turn, transmits the data received from the terminals 31 to 34 to the CPU 14 via the wireless LAN interface 19 and the bus 24. In accordance with the received data regarding the radio field intensity, the CPU 14 increases or decreases the amount of signal current for the data to be transmitted. The signal current for the data is outputted to the antenna 13, which is connected to the wireless LAN interface 19.

The radio field intensity also may be inputted from the terminals 35 and 36 that are connected to the LAN 60. The terminals 35 and 36 transmit data regarding the radio field intensity to the connector 21. The connector 21 transmits the data received from the terminals 35 and 36 to the CPU 14 via the LAN interface 20 and the bus 24. In accordance with the received data regarding the radio field intensity, the CPU 14 increases or decreases the amount of signal current for the data to be transmitted. The signal current is outputted to the antenna 13, which is connected to the wireless LAN interface 19.

Furthermore, the CPU 14 compares passwords inputted from the terminals 31 to 36 with ones stored in the HDD 16. When they match, the CPU 14 allows the terminals 31 to 36 to transmit the data regarding the radio field intensity. The passwords stored in the HDD 16 are inputted previously, for example, using the keys 12.

Figure 6:
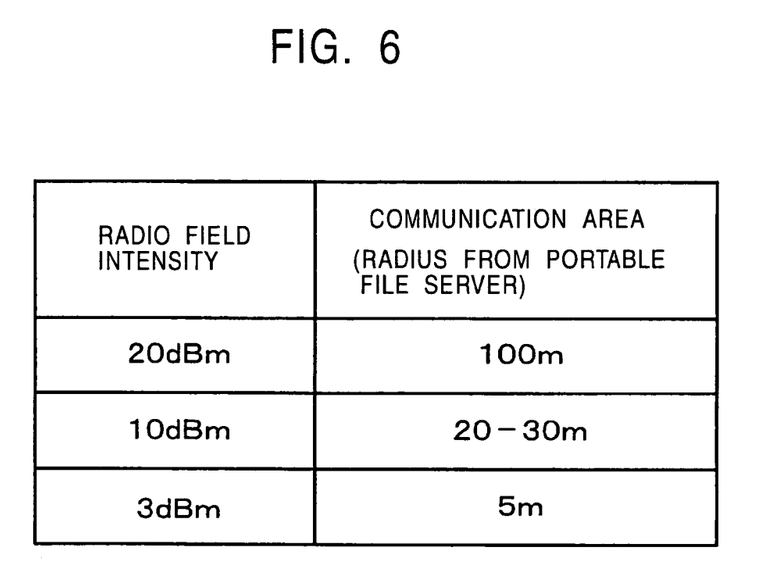
FIG. 6 is a table showing the relationship between radio field intensity and communication area.

FIG. 6 shows the experimental relationship between radio field intensity and communication area when no obstacles are present in the communication area. Referring to FIG. 6, when the amount of current from the wireless LAN interface 19 was controlled such that radio waves with a radio field intensity of 20 dBm were transmitted from the antenna 13, the communication area was within a 100-m radius of the portable file server 10. When the amount of current from the wireless LAN interface 19 was controlled such that radio waves with a radio field intensity of 10 dBm were transmitted from the antenna 13, the communication area was within a radius of 20 to 30 meters from the portable file server 10. When the amount of current from the wireless LAN interface 19 was controlled such that radio waves with a radio field intensity of 3 dBm were transmitted from the antenna 13, the communication area was within a 5-m radius of the portable file server 10.

Now, the operation of the portable file server 10 will be described hereinbelow. The radio field intensity is set depending on where the portable file server 10 is used. For example, when the portable file server 10 is used in a conference room, the radio field intensity is set such that wireless communication is available exclusively in the conference room.

The radio field intensity is inputted using the keys 12 in the portable file server 10. The CPU 14 instructs the wireless LAN interface 19 to increase or decrease the amount of signal current for the data to be outputted to the antenna 13 in accordance with the radio field intensity inputted through the keys 12. The wireless LAN interface 19 outputs the signal current for the data to the antenna 13 in accordance with the current amount instructed by the CPU 14.

Figure 7:
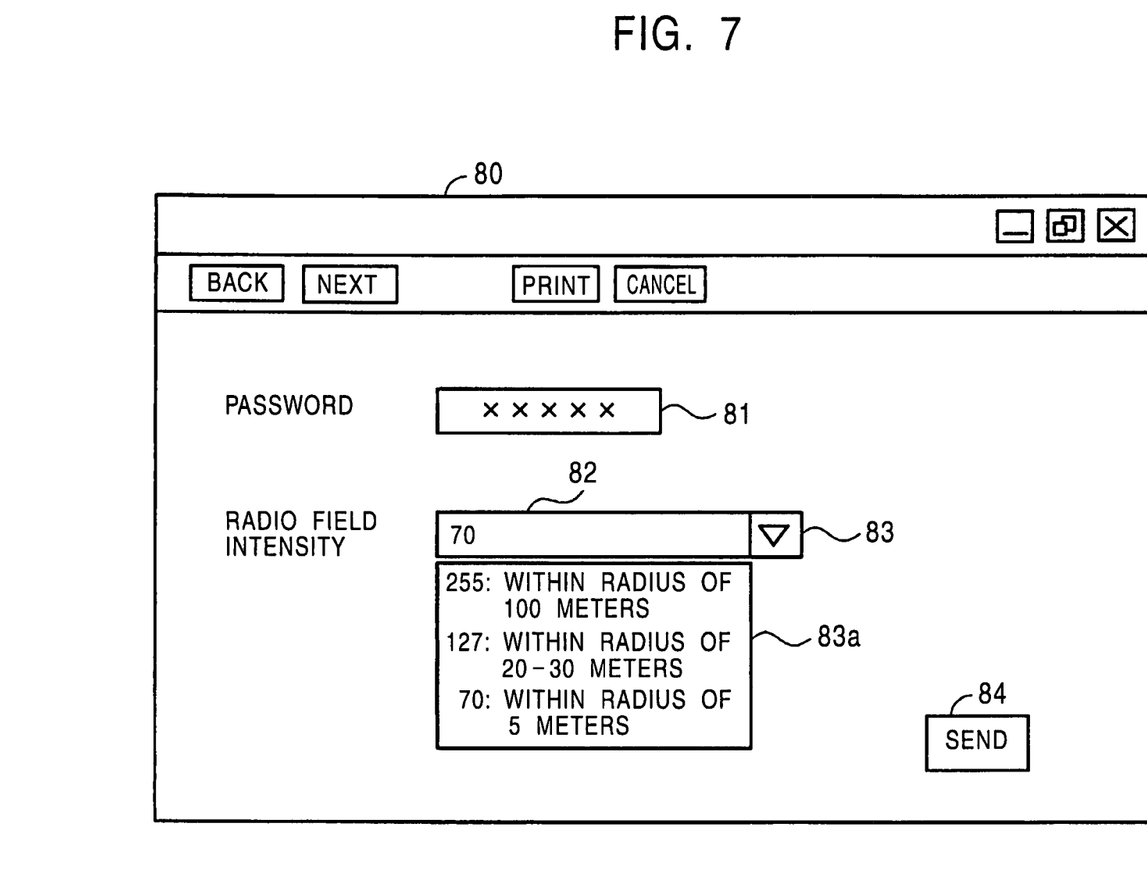
FIG. 7 is a schematic drawing of a window for setting radio field intensity on a display of a terminal.

The radio field intensity may be inputted from the terminals 31 to 36. FIG. 7 typically shows a window for setting the radio field intensity on a display in a terminal. Referring to FIG. 7, a window 80 is displayed on the displays of the terminals 31 to 36 and includes a password input section 81, a radio field intensity input section 82, and buttons 83 and 84.

The password input section 81 is a text box for inputting passwords. A password must be inputted in the password input section 81 to change the radio field intensity of the portable file server 10.

The radio field intensity input section 82 is a text box for inputting the radio field intensity for the portable file server 10. The radio field intensity input section 82 accepts integers. The radio field intensity of the portable file server 10 is set in accordance with the inputted integer. Alternatively, the radio field intensity may be selected from a list of radio field intensity settings 83a. Clicking on the button 83 will display the list of radio field intensity settings 83a. For example, selecting "70: WITHIN RADIUS OF 5 METERS" from the list of radio field intensity settings 83a sets the same radio field intensity as when inputting "70" in the radio field intensity input section 82.

Pressing the button 84 transmits the password inputted in the password input section 81 and the radio field intensity inputted in the radio field intensity input section 82 to the portable file server 10. The passwords and radio field intensity transmitted from the terminals 31 to 34 are received by the antenna 13 in the portable file server 10 and are transmitted to the CPU 14 through the wireless LAN interface 19 and the bus 24. The passwords and radio field intensity transmitted from the terminals 35 and 36 are received by the connector 21 and are transmitted to the CPU 14 through the LAN interface 20 and the bus 24.

The CPU 14 compares the passwords transmitted from the terminals 31 to 36 with the passwords stored in the HDD 16. If there is no match, the CPU 14 informs the terminals that the inputted passwords are incorrect and the terminals display windows for reentering the passwords.

If the passwords match, the CPU 14 instructs the wireless LAN interface 19 to control the signal current in accordance with the radio field intensity inputted from the terminals 31 to 36. The wireless LAN interface 19 increases or decreases the amount of signal current for the data to be transmitted in accordance with the radio field intensity instructed by the CPU 14. The controlled signal current is, in turn, outputted to the antenna 13.

For example, referring to FIG. 7, an authorized password is inputted in the password input section 81 and "70", which is receivable within a 5-m radius of the portable file server 10, is inputted in the radio field intensity input section 82 in the window 80. The wireless LAN interface 19 increases or decreases the amount of signal current for the data to be outputted to the antenna 13 such that the portable file server 10 wirelessly communicates with the terminals 31 to 34 within a 5-m radius of the portable file server 10.

When requested to transmit data by the terminals 31 to 34, the CPU 14 receives the requested data from the HDD 16 where the data is stored. The CPU 14 transmits the data from the HDD 16 to the wireless LAN interface 19 via the bus 24. The wireless LAN interface 19 controls the amount of signal current for the data to be transmitted in accordance with the inputted radio field intensity and outputs the signal current to the antenna 13. The antenna 13, in turn, transmits the data to the terminals 31 to 34 over radio waves.

When data transfer between the terminals 31 to 34 is requested, the antenna 13 receives a data signal regarding the data to be transferred from one of the terminals 31 to 34. The wireless LAN interface 19 connected to the antenna 13 transmits the received data signal to the CPU 14. The CPU 14 transmits the received data signal to the wireless LAN interface 19. The wireless LAN interface 19 controls the amount of signal current for the data to be transferred in accordance with the inputted radio field intensity and transmits the controlled signal current to a specified terminal through the antenna 13.

When requested to store data by the terminals 31 to 34, the CPU 14 instructs the HDD 16 to store data transmitted from the terminals 31 to 34. Requests for data transmission, data transfer, and data storage in the terminals 35 and 36 are accomplished through the LAN 60, the cradle 50, the connector 21, and the LAN interface 20.

If power fails or if the plug of the AC adaptor 70 comes out from the outlet resulting in interruption of the power supply from the AC adaptor 70, the supply circuit 22 switches the power source to the battery 23 to supply electricity to the components of the portable file server 10.

According to the present invention, the radio field intensity is set such that the radio waves can be received only within the area where the portable file server 10 wirelessly communicates with the terminals. Accordingly, the wireless network is established in a specified area such that wireless access from outside of the established wireless network is prevented. Hence, the portable file server 10 prevents unauthorized access and thus provides improved security.

Since the users of the terminals 31 to 36 can input the radio field intensity from their own terminals, the radio field intensity can be readily set without operating the portable file server 10.

Furthermore, passwords are required to input the radio field intensity from the terminals 31 to 36. Only when the password is authorized can the user input the radio field intensity. Thus, an unauthorized third party cannot increase the radio field intensity to access the established network.

If the power supply to the AC adaptor 70 from the outlet is interrupted, the power source is switched to the battery 23 to supply electricity to the portable file server 10, thereby preventing loss of stored data.

Furthermore, since the portable file server 10 may be connected to the LAN 60, the terminals wirelessly connected to the portable file server 10 can share data with other terminals having no wireless function.

The terminals may be other electronic devices with data, such as a digital camera or a game device. In these electronic devices, for example, image data of photos or history data of games are transmitted and received between the portable file server 10 and the terminals and are stored in the portable file server 10. In this case, also, unauthorized access by a third party is prevented.

What is claimed is:

1. A portable file server configured to wirelessly transmit and receive data to and from a terminal, the portable file server comprising:
   a radio field intensity input unit configured to receive through an antenna an input identifying a distance indicating a radio field intensity value from a user interface displayed by the terminal;
   the antenna configured to wirelessly transmit and receive the data within a radio field that is in accordance with a radio field intensity determined by a signal current amount controlled by a current controller; and
   the current controller configured to increase or decrease the signal current amount for the data in accordance with the radio field intensity value,
   wherein the user interface presents a list of distinct distances corresponding to a plurality of predetermined field intensities, the input identifies the distance from the list of distinct distances, and the radio field intensity value indicated by the distance is one of the plurality of predetermined field intensities,
   wherein each distance represents an effective distance of the radio field for wirelessly transmitting and receiving data to and from the terminal,
   wherein the radio field intensity input unit receives the input from the terminal if a password received from the terminal matches a password stored in the portable file server, and
   wherein the radio filed intensity value is selectable by both the portable file server and through the user interface displayed by the terminal when the password received from the terminal matches the password stored in the portable file server.

2. A portable file server according to claim 1, further comprising a wired data transmission and reception unit configured to transmit and receive the data over a wired network.

3. A portable file server according to claim 1, wherein the portable file server configured to be connected to a cradle, the cradle having a wired network connect to a wired LAN, and the portable file server communicates with terminals on the wired LAN by transmitting and receiving data to and from the terminals on the wired LAN when the portable file server is connected to a cradle.

4. A portable file server according to claim 1, the portable file server further comprising:
   a supply circuit adapted to distribute power to components of the portable file server; and
   a first power supply;
   wherein the portable file server configured to be connected to a cradle, the cradle being connected to a second power supply; and the supply circuit being adapted to draw power from the second power supply when the portable file server is connected to the cradle, and to draw power from the first power supply when the portable file server is not connected to the cradle.

5. A portable file server according to claim 1, wherein the radio field intensity input unit allows the input to be inputted via an interface, having a plurality of keys, located on the outer surface of the portable file server.

6. A portable file server according to claim 1, the portable file server further comprising:
   a hard drive adapted to store and provide the data to and from the terminal; a random access memory; and a CPU.

7. A portable file server according to claim 6, wherein a plurality of terminals can wirelessly store and receive data stored on the hard drive.

8. A portable file server according to claim 1, wherein each of the plurality of predetermined field intensities limits each corresponding effective distance for wirelessly transmitting and receiving data to and from the terminal.

9. A portable file server according to claim 1, the portable file server, wherein the user interface is also displayed by a display of the portable file server that is configured to receive the input.

10. A portable file server according to claim 1, wherein the list of distinct distances presented by the user interface includes 100 meters, 20-30 meters, 5 meters, and the corresponding plurality of predetermined field intensities respectively includes 20 dBm, 10 dBm, and 3 dBm.

* * * * *